United States Patent
Hsien

(10) Patent No.: US 8,520,459 B2
(45) Date of Patent: Aug. 27, 2013

(54) METHOD FOR STORING DATA INTO A MEMORY

(75) Inventor: Chao-Chung Hsien, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 231 days.

(21) Appl. No.: 13/091,433

(22) Filed: Apr. 21, 2011

(65) Prior Publication Data
US 2011/0261638 A1 Oct. 27, 2011

Related U.S. Application Data

(60) Provisional application No. 61/327,725, filed on Apr. 26, 2010.

(51) Int. Cl.
*G11C 7/00* (2006.01)
(52) U.S. Cl.
USPC .............. 365/218; 365/185.14; 365/189.01
(58) Field of Classification Search
USPC .............. 365/218, 185.29, 185.14, 189.01, 365/230.03, 185.33, 189.04, 189.05, 233, 365/230.01; 711/103, 203, 202, 114, 170, 711/172
See application file for complete search history.

(56) References Cited

U.S. PATENT DOCUMENTS

| | | | |
|---|---|---|---|
| 2002/0085229 A1* | 7/2002 | Ikegami et al. | 358/1.16 |
| 2004/0027856 A1 | 2/2004 | Lee et al. | |
| 2011/0082966 A1* | 4/2011 | Yu et al. | 711/103 |

FOREIGN PATENT DOCUMENTS

JP 2009-296436 12/2009

OTHER PUBLICATIONS

English translation of abstract of JP 2009-296436.
English translation of portions of JP 2009-296436.

* cited by examiner

*Primary Examiner* — Dang Nguyen
(74) *Attorney, Agent, or Firm* — McClure, Qualey & Rodack, LLP

(57) ABSTRACT

A method for storing data into a memory is provided. In this method, at first, data desired to be written into the memory is provided, wherein the data comprises a plurality of data records. Then, a memory space of the memory for storing the data is provided. Thereafter, a data-writing step is performed to write the data into the memory. In the data-writing step, at first, it is determined that if the values of all the data records of the data are cleared values to provide a first determined result. Then, it is determined that if the data matches an erasing unit of the memory to provide a second determined result. Thereafter, the contents of the memory space are erased, when both the first determined result and the second determined result are yes.

20 Claims, 2 Drawing Sheets

METHOD FOR STORING DATA INTO A MEMORY

RELATED APPLICATIONS

The application claims priority to Provisional Application Ser. No. 61/327,725 filed on Apr. 26, 2010, entitled "User Interface and Applications for Mobile Devices", the entire disclosure of which is incorporated herein by reference.

BACKGROUND

1. Field of Invention

The present invention relates to a method for storing data into a memory. More particularly, the present invention relates to a method for storing data into a memory having an erasing unit.

2. Description of Related Art

In recent years, a mobile phone plays an important role in human life with the development of wireless communication technology. For meeting various demands, the mobile phone may have complex functions and structures. For example, the mobile phone may have a processor and a memory for processing an operation system to provide video play function, e-mail function, web browsing function, etc.

In general, the functions can be provided by the mobile phone are depended on a firmware implemented therein. The firmware can be such as a firmware image file stored in the memory of the mobile phone. When the mobile phone is booted, the image file is loaded to enable the mobile phone to provide various functions.

For meeting the increasing requirements of the mobile phone, the mobile phone manufacturer usually have to update the firmware frequently. However, the step of updating the firmware takes a lot of time, and thus the production efficiency of the mobile phone is decreased. Therefore, there is a need to develop a method for rapidly updating the firmware.

SUMMARY

An aspect of the present invention is to provide a method and a device for storing data into a memory, thereby providing a faster speed of writing an image file into a memory of a mobile phone.

According to one embodiment of the present invention, in the method for storing data into a memory, at first, the data desired to be written into the memory is provided, wherein the data includes a plurality of data records. Then, a memory space of the memory for storing the data is provided. Thereafter, a data-writing step is performed to write the data into the memory. In the data-writing step, at first, it is determined that if all of the values of the data records are cleared values (such as 0xff or 0x00) to provide a first determined result. Then, it is determined that if the data segment matches the erasing unit of the memory to provide a second determined result, wherein the erasing unit is the smallest unit for performing a data erasing operation of the memory. Thereafter, the contents of the memory space are erased when both the first determined result and the second determined result are yes, thereby completing the data-writing step for writing the data segment into the memory.

In one embodiment of the present invention, in the method for storing data into a memory, at first, the data desired to be written into the memory is provided, wherein the data includes a plurality of data segments and each of the data segments includes a plurality of data records. Then, a memory space within the memory is provided, wherein the memory space includes a plurality of memory segments for storing the data segments, and each of the erasing units are the smallest unit of the memory for performing a data erasing operation. Thereafter, a data-writing step is repeated for writing the data segments into the memory segments in a one to one manner. In the data-writing step, at first, it is determined that if all of the values of the data records are cleared values to provide a first determined result. Then, it is determined that if the one of the data segments matches one of the erasing units of the memory to provide a second determined result. Thereafter, the contents of the memory space are erased when both the first determined result and the second determined result are yes, thereby completing the data-writing step for writing the one of the data segments into the memory.

In one embodiment of the present invention, the device comprises: means for providing the data desired to be written into the memory, wherein the data comprises a plurality of data records; means for providing a memory space of the memory for storing the data; and means for performing a data-writing step to write the data into the memory. The means for performing the data-writing step comprises: means for determining if all of the values of the data records are cleared values to provide a first determined result; means for determining if the data matches an erasing unit of the memory to provide a second determined result, wherein the erasing unit is the smallest unit for performing a data erasing operation of the memory; and means for erasing the contents of the memory space when both the first determined result and the second determined result are yes, thereby completing the data-writing step for writing the data into the memory.

In one embodiment of the present invention, the memory comprises a plurality of erasing units, and each of the erasing units is the smallest unit for performing a data erasing operation of the memory, and the device for storing data into the memory comprises: means for providing the data desired to be written into the memory, wherein the data comprises a plurality of data segments and each of the data segments comprises a plurality of data records; means for providing a memory space within the memory, wherein the memory space comprises a plurality of memory segments for the data segments; and means for repeating a data-writing step for writing the data segments into the memory segments in a one to one manner. The means for repeating the data-writing step comprises: means for determining if the values of all the data records of one of the data segment are cleared values to provide a first determined result; means for determining if the one of the data segments matches one of the erasing units of the memory to provide a second determined result; and means for erasing the content of one of the memory segment corresponding to the one of the data segment when both the first determined result and the second determined result are yes, thereby completing the data-writing step for writing the one of the data segments into the memory.

The methods and devices of the embodiments of the present invention use the erasing operation of the memory to write data with cleared values, thereby decreasing a great amount of time needed for the writing of the image file.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
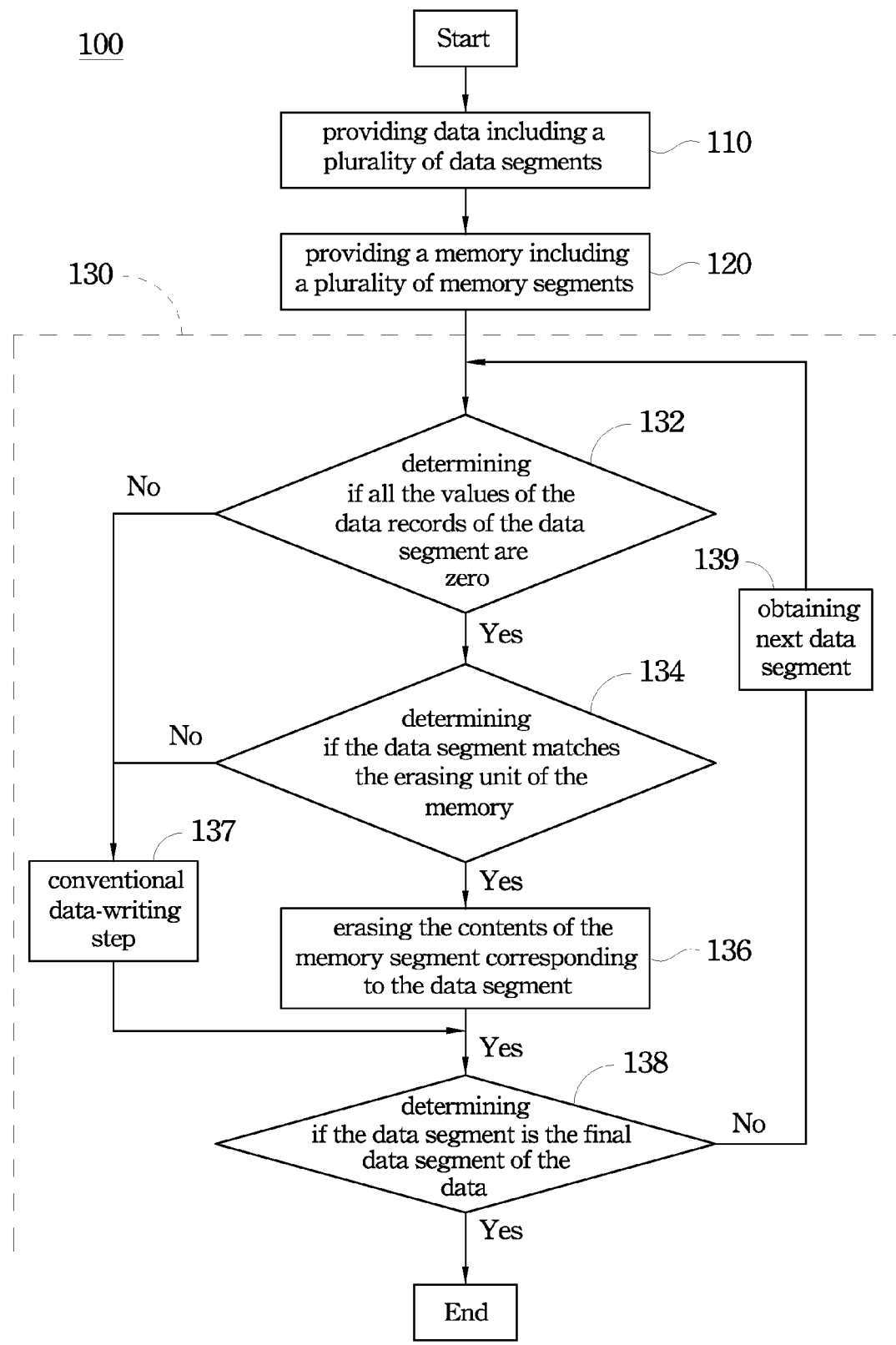
FIG. 1 is a flow chart showing the data storing method according to an embodiment of the present invention.

Reference will now be made in detail to the present preferred embodiments of the invention, examples of which are illustrated in the accompanying drawings. Wherever possible, the same reference amounts are used in the drawings and the description to refer to the same or like parts.

Figure 2:
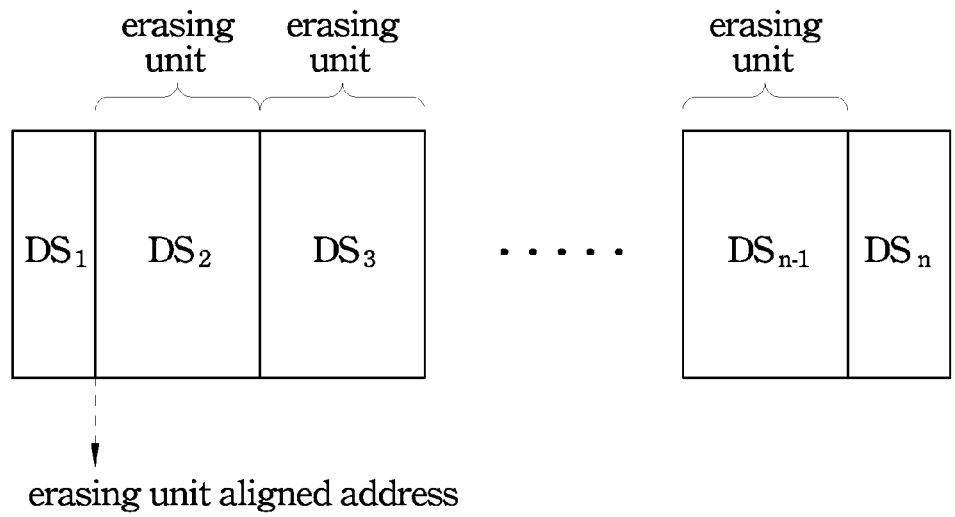
FIG. 2 is a diagram showing the structure of data desired to be written into a memory of a mobile phone according to an embodiment of the present invention.
Figure 3:
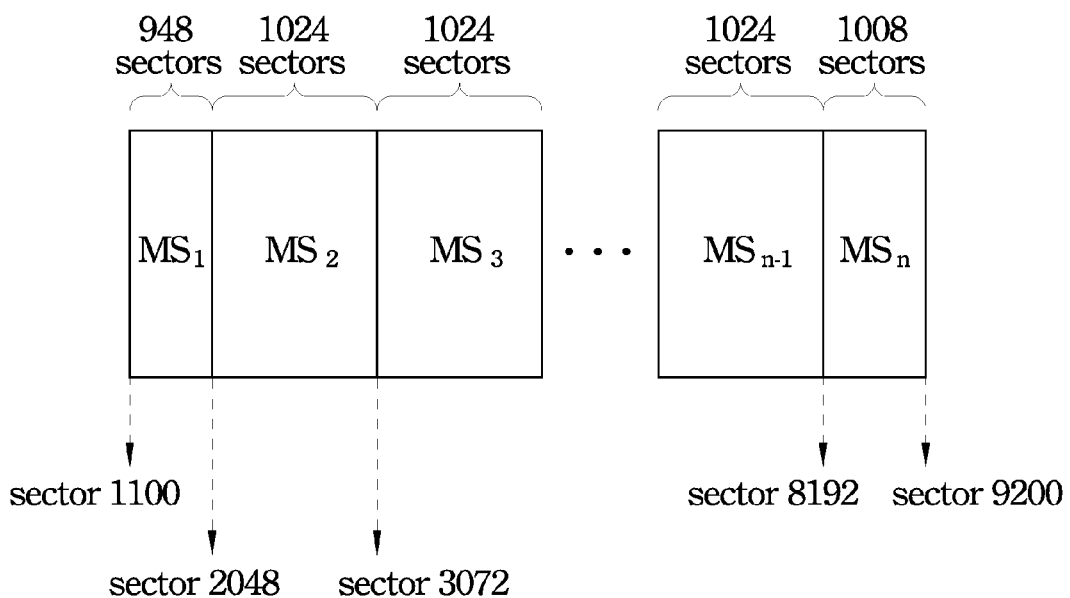
FIG. 3 is a diagram showing partial structure of the memory into which the data desired to be written according to an embodiment of the present invention.

Referring to FIG. 1 to FIG. 3, FIG. 1 is a flow chart showing the data storing method 100 according to an embodiment of the present invention, and FIG. 2 is a diagram showing the structure of data desired to be written into a memory of a mobile phone, and FIG. 3 is a diagram showing partial structure of the memory into which the data desired to be written. In this embodiment, the memory is a flash memory and the data is an image file, but the embodiments of the present invention are not limited thereto. In addition, the memory may store other data in addition to the image file data.

In the data storing method 100, a data providing step 110 is first performed. The data-providing step 110 provides data 200 as shown in FIG. 2. The data 200 includes a plurality data records (not shown). The data records are in the form of hexadecimal code such as 0x01, but the embodiments of the present invention are not limited thereto. In other embodiments, the data records can be in the form of binary code, octal code, or decimal code.

The data 200 has a plurality of data segments $DS_1$, $DS_2$, . . . $DS_n$. The data segments are continuous. The data segments are divided from the data 200 in accordance with a size of an erasing unit of the memory and the address of the erasing unit (represented by a sector number hereafter). For example, it is assumed that the data 200 (before being divided) is desired to be stored into the memory space between sector 1100 to sector 9200, and the memory 300 (shown in FIG. 3) has a plurality of erasing unit, and the size of the erasing unit is equal to 1024 sectors. Therefore, the memory space between addresses "sector 0" and "sector 1023" is the first erasing unit, and the memory space between addresses "sector 1024" and "sector 2047" is the second erasing unit, and the memory space between addresses "sector 2048" and "sector 3071" is the third erasing unit. In this case, when being divided, the data 200 is first divided into two data parts in accordance with a start address of one of the erasing unit (for example, the start address "sector 2048" of the third erasing unit). Then, a slicing operation is started at the address "sector 2048" to slice the two data parts of the data 200 into data segments in every 1024 sectors. As a result, the data 200 is divided as shown in FIG. 2.

The erasing unit is the smallest unit of the memory for performing an erasing operation. In this embodiment, the size of the erasing unit is equal to 1024 sectors, and the size of each of the sectors is 512 bytes, but the embodiments of the present invention are not limited thereto. In other embodiments of the present invention, the size of the erasing unit is 2048 kilobytes.

After the dividing operation, the data segments may include full data segments and residue data segments. Each of the full data segments, such as $DS_2$, $DS_3$, $DS_{n-1}$, has a size equal to the size of the erasing unit, and each of the residue data segments, such as $DS_1$ and $DS_n$, has a size smaller than the size of the erasing unit. The residue data segments $DS_1$, and $DS_n$ are data segments, which cannot match the erasing units. For example, in the case mentioned above, the data records corresponding to the memory space between addresses "sector 1100" and "sector 2047" are divided from the data 200 to be the residue data segment $DS_1$, because the memory space between addresses "sector 1100" and "sector 2047" does not match the size of the erasing unit. Similarly, the data records corresponding to the memory space between addresses "sector 8192" and "sector 9200" are divided from the data 200 to be the residue data segment $DS_n$, because the memory space between addresses "sector 8192" and "sector 9200" does not match the size of the erasing unit.

According to the above description, in the operation of the dividing of the data 200, one of the start addresses of the erasing units (such as address "sector 0", "sector 1024" or "sector 2048") of the memory 300 is first aligned to one of the data segment, and then the data 200 is divided in accordance with the size of the erasing unit and the start address. In addition, the address used in the dividing operation of the data 200 may be the start address or the end address of the erasing unit.

It is noted that an address selecting step can be performed to select a start address of a memory space used for storing the data 200, thereby aligning the start of the data 200 to the start address of the erasing unit of the memory 300 and eliminate the residue data segment $DS_1$. For example, the start of the data 200 can be aligned to address "sector 2048", and thus the first data segment of the data 200 can be a full data segment.

After the data-providing step 110, a memory-providing step 120 is performed to provide the memory 300 to store the data 200. As mentioned above, the memory 300 has many erasing units, thus the memory space used to store the data 200 is divided into a plurality of memory segments for storing the data segments of the data 200 in a one to one manner. As shown in FIG. 3, the memory segments include full memory segments and residue memory segments. The full memory segments, such as $MS_2$, $MS_3$, . . . $MS_{n-1}$, are the erasing units of the memory 300 and used to store full data segments $DS_2$, $DS_3$, $DS_{n-1}$. The residue memory segments, such as $MS_1$ and $MS_n$, are used to store the residue data segments $DS_1$ and $DS_n$.

It is noted that the data-providing step 110 can be performed after the memory-providing step 120. For example, the memory 300 is divided at first, and then the data 200 is divided accordingly.

After the memory-providing step 120, a data-writing step 130 is repeated for writing the data segments of the data 200 into the memory 300. In the data-writing step 130, at first, a value-comparing step 132 is performed to determine if all of the values of the data records of the data segment to be written are cleared values. For example, when the data segment $DS_1$ is written into the corresponding memory segment $MS_1$, the values of all data records of the data segment $DS_1$ are compared to cleared values, such as 0x00 or 0xff (depend on the memory format). If the values of all data records of the data segment $DS_1$ are equal to the cleared values, the following step 134 is performed. In another one embodiment of the present invention, the cleared values may be defied as a content, such as ERASE_CONTENT, including 0x00 or 0xFF.

The characteristic-comparing step 134 is performed to determine if the data segment matches the erasing unit of the memory. In one embodiment of the present invention, the characteristic-comparing step 134 may include a size-comparing step performed to determine if the size of the data segment is equal to the size of the erasing unit of the memory 300. When the size of the data segment is equal to the size of the erasing unit of the memory, it is determined that the data segment matches the erasing unit of the memory. For example, the size of the data segment $DS_1$ is not equal to the size of the erasing unit of the memory 300, so the data segment $DS_1$ is not considered as a matching segment for the erasing unit. In another example, when the data segment $DS_2$ is written into the corresponding memory segment $MS_2$, the data segment $DS_2$ is considered as a matching segment for the erasing unit in the characteristic-comparing step 134, because the size of the data segment $DS_2$ is equal to that of the erasing unit.

In another one embodiment of the present invention, the characteristic-comparing step 134 may include an address-comparing step. The address-comparing step is performed to determine if a start address and an end address of the corresponding memory of the data segment are equal to a start address and an end address of one of the erasing units of the memory, respectively. When the start address and the end address of the corresponding memory segment are equal to the start address and the end address of the erasing unit, it is determined that the data segment matches the erasing unit of the memory. For example, the start address of the memory segment $MS_1$ (sector 1100) is not equal to the start address of any one of the erasing units of the memory, so the data segment $DS_1$ is not considered as a matching segment for the erasing unit. In another example, when the data segment $DS_2$ is written into the corresponding memory segment $MS_2$, the data segment $DS_2$ is considered as a matching segment for the erasing unit in the characteristic-comparing step 134, because the start address and the end address of the memory segment MS2 ("sector 2048"-"sector 3071") are equal to the start address and the end address of one of the erasing units.

In further another one embodiment of the present invention, the data-providing step 110 includes a marking step performed to mark each of the residue data segments $DS_1$ and $DS_n$ with a symbol. Therefore, the symbol can be used in the characteristic-comparing step 134 for determining if the data segment matches the erasing unit of the memory. For example, in the marking step, a start address and an end address of the memory space for storing the data 200 are respectively compared with the start addresses and the end addresses of the erasing units of the memory. If the start address of the memory space is not equal to any one of the start addresses of the erasing units, the first data segment $DS_1$ of the data 200 is marked with the symbol, and if the end address of the memory space is not equal to any one of the end addresses of the erasing units, the last data segment $DS_n$ of the data 200 is marked with the symbol. Therefore, the step 134 checks if the data segment has the symbol, and the data segment is not considered as a matching segment for the erasing unit when it has the symbol.

After step 134, the erasing step 136 is performed to erase the contents of the memory segment used to store the data segment (for example data segment $DS_2$), when all of the values of the data records of the data segment to be written are cleared values and the data segment to be written matches the erasing unit of the memory, thereby making the contents of the memory segment become the cleared value. Then, a checking step 138 is performed to determine if the data segment processed is the last data segment of the data 200. If the data segment proceeded is not the last data segment of the data 200, a step 139 is performed to obtain the next data segment (for example data segment $DS_3$ which is next to the data segment $DS_2$), and thus the data-writing step 130 is repeated for writing the following data segments.

In contrast, if one of the values of the data records of the data segment to be written is not the cleared value, or if the data segment to be written does not match the erasing unit of the memory, the conventional data-writing step 137 is performed to write the data segment into the corresponding memory segment.

With respect to an erasing operation of a memory, erasing contents of an erasing unit is faster than writing values into the memory space within the erasing unit. In addition, the contents of the erasing unit become the cleared values after erased. Therefore, if data records of data desired to be written are all the cleared values, the contents of the erasing unit used to store the data can be erased, thereby storing the data into the erasing unit and speeding up the writing of the data. It is noted that the step 132 and 134 can be performed in parallel or in sequential. In addition, if all values of the data are known before the data is written into a memory, the value-comparing step can be ignored. For example, if the data records of the data segments $DS_1, DS_2, \ldots DS_n$ are the cleared values, and it is known before the data segments $DS_1, DS_3, \ldots DS_n$ are written, the value comparing step 134 can be ignored, and then the contents of the memory segments for storing the data segments $DS_2, DS_3, \ldots DS_{n-1}$ are erased in the erasing step 136.

According to the embodiments mentioned above, when the data records of data (or data segments) desired to be written are all the cleared values, the contents of the memory used to store the data are erased, thereby decreasing the time need for the writing of the data. With respect to an image data, it may include many data records having cleared values. Therefore, the methods disclosed by the embodiments of the present invention may decrease a great amount of time needed for the writing of the image file.

Please note that the abovementioned steps of the processes 110, 120, 130, 132, 134, 136 or other exemplary processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), and computer on module (COM).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for storing data into a memory, comprising:
   providing the data desired to be written into the memory, wherein the data comprises a plurality of data records;
   providing a memory space of the memory for storing the data; and
   performing a data-writing step to write the data into the memory, wherein the data-writing step comprises:
   determining if all of the values of the data records are cleared values to provide a first determined result;
   determining if the data matches a characteristic of erasing unit of the memory to provide a second determined result, wherein the erasing unit is the smallest unit for performing a data erasing operation of the memory, and the data erasing operation is faster than a data writing operation for the erasing unit; and
   performing the data erasing operation instead of the data writing operation to erase contents of the memory space to complete the data-writing step for writing the data into the memory when both the first determined result and the second determined result are yes.

2. The method of claim 1, wherein the step for determining if the data matches the characteristic of erasing unit comprises:
   determining if a start address and an end address of the memory space are respectively equal to a start address and an end address of the erasing unit of the memory to provide a third determined result; and
   defining the second determined result as yes, when the third determined result is yes.

3. The method of claim 1, wherein the step for determining if the data matches the characteristic of erasing unit comprises:
   determining if the size of the data is equal to the size of the erasing unit, and
   defining the second determined result as yes when the size of the data is equal to the size of the erasing unit.

4. The method of claim 1, wherein the cleared value is zero or a maximum value defined by a memory format.

5. A device for storing data into a memory, comprising:
   means for providing the data desired to be written into the memory, wherein the data comprises a plurality of data records;
   means for providing a memory space of the memory for storing the data;
   means for performing a data-writing step to write the data into the memory, comprising:
   means for determining if all of the values of the data records are cleared values to provide a first determined result;
   means for determining if the data matches a characteristic of erasing unit of the memory to provide a second determined result, wherein the erasing unit is the smallest unit for performing a data erasing operation of the memory, and the data erasing operation is faster than a data writing operation for the erasing unit; and
   means for performing the data erasing operation instead of the data writing operation to erase contents of the memory space to complete the data-writing step for writing the data into the memory when both the first determined result and the second determined result are yes.

6. The device of claim 5, wherein the means for determining if the data matches the characteristic of erasing unit of the memory comprises:
   means for determining if a start address and an end address of the memory space are respectively equal to a start address and an end address of the erasing unit of the memory to provide a third determined result; and
   means for defining the second determined result as yes, when the third determined result is yes.

7. The device of claim 5, wherein the means for determining if the data matches the characteristic of erasing unit of the memory comprises:
   means for determining if the size of the data is equal to the size of the erasing unit, and
   means for defining the second determined result as yes when the size of the data is equal to the size of the erasing unit.

8. A method for storing data into a memory, wherein the memory comprises a plurality of erasing units, and each of the erasing units is the smallest unit for performing a data erasing operation of the memory, and the data erasing operation is faster than a data writing operation for each of the erasing units, and the method for storing data into the memory comprises:
   providing the data desired to be written into the memory, wherein the data comprises a plurality of data segments and each of the data segments comprises a plurality of data records;
   providing a memory space within the memory, wherein the memory space comprises a plurality of memory segments for the data segments; and
   repeating a data-writing step for writing the data segments into the memory segments in a one to one manner, wherein the data-writing step comprises:
   determining if the values of all the data records of one of the data segment are cleared values to provide a first determined result;
   determining if the one of the data segments matches a characteristic of one of the erasing units of the memory to provide a second determined result; and
   performing the data erasing operation instead of the data writing operation to erase a content of one of the memory segment corresponding to the one of the data segment to complete the data-writing step for writing the one of the data segments into the memory when both the first determined result and the second determined result are yes.

9. The method of claim 8, wherein the step for providing the data comprises dividing the data in accordance with the size of each of the erasing units of the memory and an address of one of the erasing units to obtain the data segments.

10. The method of claim 9, wherein the step for providing the data further comprises:
    determining if a start address of the memory space is equal to one of a plurality of start addresses of the erasing units to provide a third determined result;
    marking a first one of the data segments with a symbol when the third determined result is no;
    determining if an end address of the memory space is equal to one of a plurality of end addresses of the erasing units to provide a fourth determined result; and
    marking a last one of the data segments with the symbol when the fourth determined result is no.

11. The method of claim 10, wherein the step for determining if the one of the data segments matches the characteristic of one of the erasing units comprises:
    checking if the one of the data segments has the symbol; and
    defining the second determined result as no, when the one of the data segments has the symbol.

12. The method of claim 8, wherein the step for determining if the one of the data segments matches the characteristic of one of the erasing units comprises:
    determining if the size of the one of the data segment is equal to the size of each of the erasing units, and
    defining the second determined result as yes when the size of the one of the data segment is equal to the size of each of the erasing units.

13. The method of claim 8, wherein the step for determining if the one of the data segments matches the characteristic of one of the erasing units comprises:
    determining if a start address and an end address of the one of the memory segments are equal to a start address and an end address of one of the erasing units, respectively; and
    defining the second determined result as yes when the start address and the end address of the one of the memory segments are equal to the start address and an the address of the one of the erasing units, respectively.

14. The method of claim 8, wherein the cleared value is zero or a maximum value defined by a memory format.

15. A device for storing data into a memory, wherein the memory comprises a plurality of erasing units, and each of the erasing units is the smallest unit for performing a data erasing operation of the memory, and the data erasing operation is faster than a data writing operation for each of the erasing units, and the device for storing data into the memory comprises:

means for providing the data desired to be written into the memory, wherein the data comprises a plurality of data segments and each of the data segments comprises a plurality of data records;
   means for providing a memory space within the memory, wherein the memory space comprises a plurality of memory segments for the data segments; and
   means for repeating a data-writing step for writing the data segments into the memory segments in a one to one manner, comprising:
   means for determining if the values of all the data records of one of the data segment are cleared values to provide a first determined result;
   means for determining if the one of the data segments matches a characteristic of one of the erasing units of the memory to provide a second determined result; and
   means for performing the data erasing operation instead of the data writing operation to erase a content of one of the memory segment corresponding to the one of the data segment to complete the data-writing step for writing the one of the data segments into the memory when both the first determined result and the second determined result are yes.

16. The device of claim 15, wherein the means for providing the data desired to be written comprises means for dividing the data in accordance with the size of each of the erasing units of the memory and an address of one of the erasing units to obtain the data segments.

17. The device of claim 16, wherein the means for providing the data further comprises:

means for determining if a start address of the memory space is equal to one of a plurality of start addresses of the erasing units to provide a third determined result;
   means for marking a first one of the data segments with a symbol when the third determined result is no;
   means for determining if an end address of the memory space is equal to one of a plurality of end addresses of the erasing units to provide a fourth determined result; and
   means for marking a last one of the data segments with the symbol when the fourth determined result is no.

18. The device of claim 17, wherein the means for determining if the one of the data segments matches the characteristic of one of the erasing units comprises:

means for checking if the one of the data segments has the symbol; and
   means for defining the second determined result as no, when the one of the data segments has the symbol.

19. The device of claim 15, wherein the means for determining if the one of the data segments matches the characteristic of one of the erasing units comprises:

means for determining if the size of the one of the data segment is equal to the size of each of the erasing units, and
   means for defining the second determined result as yes when the size of the one of the data segment is equal to the size of each of the erasing units.

20. The device of claim 15, wherein the means for determining if the one of the data segments matches the characteristic of one of the erasing units comprises:

means for determining if a start address and an end address of the one of the memory segments are equal to a start address and an end address of one of the erasing units, respectively; and
   means for defining the second determined result as yes when the start address and the end address of the one of the memory segments are equal to the start address and an the address of the one of the erasing units, respectively.

* * * * *